(12) United States Patent
Usui et al.

(10) Patent No.: US 7,038,908 B2
(45) Date of Patent: May 2, 2006

(54) DOCKING-TYPE FUNCTION-PROVIDING APPARATUS AND PORTABLE DEVICE

(75) Inventors: Hideyuki Usui, Chigasaki (JP); Kazuihiko Yamazaki, Hiratsuka (JP); Hisashi Shima, Yamato (JP)

(73) Assignee: Lenovo (Singapore) Pty. Ltd., Singapore (SG)

( * ) Notice: Subject to any disclaimer, the term of this patent is extended or adjusted under 35 U.S.C. 154(b) by 202 days.

(21) Appl. No.: 10/730,320

(22) Filed: Dec. 8, 2003

(65) Prior Publication Data

US 2004/0145864 A1 Jul. 29, 2004

(30) Foreign Application Priority Data

Jan. 21, 2003 (JP) .............................. 2003-012535

(51) Int. Cl.
*G06F 1/16* (2006.01)
(52) U.S. Cl. ....................................... 361/686; 710/303
(58) Field of Classification Search ................ 361/686; 710/303, 304
See application file for complete search history.

(56) References Cited

U.S. PATENT DOCUMENTS 5,182,698 A * 1/1993 Kobayashi et al. ......... 361/686
5,699,226 A * 12/1997 Cavello ...................... 361/686
5,862,036 A * 1/1999 Lin ............................. 361/686
6,061,233 A * 5/2000 Jung .......................... 361/686
6,115,247 A * 9/2000 Helot ......................... 361/686
6,142,593 A * 11/2000 Kim et al. .................. 361/686
6,222,728 B1 * 4/2001 Jaggers et al. .............. 361/686
6,297,953 B1 * 10/2001 Helot ......................... 361/686
6,301,106 B1 * 10/2001 Helot et al. ................. 361/686

FOREIGN PATENT DOCUMENTS

JP 08-006669 1/1996
JP 2001-306186 11/2001

* cited by examiner

*Primary Examiner*—Lisa Lea-Edmonds
(74) *Attorney, Agent, or Firm*—Sawyer Law Group; Scott W. Reid

(57) ABSTRACT

A docking-type function-providing apparatus for providing a predetermined function to a portable device docked with the apparatus via their respective connectors has a coupling face 1 coupled with a device coupling face on the portable device at the time of docking, the connector 2 of the apparatus provided on the coupling face 1 to connect with the connector of the device by the above-mentioned coupling, and a guide face 3 parallel to a plane intersecting the coupling face 1 and capable of guiding a guided face on the portable device at the time of docking. The position of the guide face 3 can be changed in the direction of intersection with the guide face 3.

14 Claims, 14 Drawing Sheets

DOCKING-TYPE FUNCTION-PROVIDING APPARATUS AND PORTABLE DEVICE

FIELD AND BACKGROUND OF INVENTION

The present invention relates to a docking station which provides a predetermined function for a portable device when the portable device is docked with the docking station, a docking-type function-providing apparatus such as a port replicator, and a portable device capable of being docked with the function-providing apparatus.

In recent years, computer products such as notebook PCs designed by attaching importance to portability have been developed. On the other hand, making of products designed by considering expandability with respect to ordinary use is always demanded. Port replicators are known as a device designed to liberate users from troublesome operations for inserting and pulling out various cables in desktop use of notebook PCs. A port replicator provides not only the function of replicating ports but also the function of expanding ports. That is, a port replicator is equipped with a port which is not necessary when a notebook PC is used while being carried, and the port can be provided for the notebook PC when the notebook PC is docked with the port replicator.

A docking station designed to provide the function of using an adaptor card or the like which cannot be realized in a portable computer is also known. As such a docking station, a docking device is known which has a plurality of connectors which can be respectively connected to a plurality of kinds of notebook PC, and a tray for sliding each kind of notebook PC to a docking position according to its size, and which is capable of docking with each of the plurality of kinds of notebook PC by using the connects and the tray (see Japanese Published Unexamined Patent Application No.8-6669, for example). Another docking station is also known which is designed in such a manner that a connector for connection to a notebook PC is provided on a supporting surface on which the notebook PC is supported when docked, and the notebook PC is connected to the connector by being placed from above onto the supporting surface (see Japanese Published Unexamined Patent Application No. 2001-306186, for example).

Users want to use next-generation products by investing a least amount of money in improving docking stations or the like even if there is a need to entirely renew personal computers. In a case where new and old models of notebook PCs are mixedly used in one section, a docking station which cannot be used in combination with old models is inconvenient in terms of operation. Also on the supplier side, from the viewpoint of handling cost, etc., it is not preferable to prepare a docking station for each of different products. Therefore, it is desirable that a small number of kinds of docking station be adapted to a multiplicity of products.

On the other hand, improvements in portability and handling of portable PCs are being pursued. Therefore, there is a demand for a higher degree of freedom in selection of the position of a connector for connection to a docking station for convenience of parts layout.

SUMMARY OF THE INVENTION

In view of the above-described demands, one purpose of the present invention is to provide a docking-type function-providing apparatus capable of docking with each of a plurality of models of portable devices through a common connector of the apparatus without any inconvenience no matter what connector position variations between the models of the portable devices.

To achieve the above-described purpose, according to the present invention, there is provided a docking-type function-providing apparatus for providing a predetermined function to a portable device docked with the apparatus via their respective connectors, the apparatus including a coupling face that couples with the device coupling face on the portable device during docking, the connector of the apparatus provided on the coupling face to connect with the connector of the device by the above-mentioned coupling, and a guide face that intersects with the coupling face or its extension and guides the guided face on the portable device during docking, wherein the position of the guide face can be changed in the direction of intersection with the guide face.

For example, a notebook-type personal computer, a sub-notebook-type personal computer, or a palmtop personal computer corresponds to the portable device. For example, a docking station or a port replicator corresponds to the docking-type function-providing apparatus. For example, the function of completing external connections through a plurality of ports only by performing docking, the function of expanding usable ports, or the function of providing an expansion slot or a drive bay corresponds to the predetermined function. For example, a mode in which the coupling face and the mated coupling face are opposed to each other with an elastic member or the like interposed therebetween or a mode in which the two faces partially or entirely contact each other to be fixed on each other corresponds to the mode of coupling between the coupling face and the mated coupling face. For example, a bottom face (reverse face) of a notebook PC corresponds to the mated coupling face on the portable device. For example, a back face of a notebook PC corresponds to the guided face of the portable device. For example, a face intersecting the coupling face at right angles corresponds to the face intersecting the coupling face. For example, a direction intersecting the guide face at right angles corresponds to the direction of intersection with the guide face.

In the above-described arrangement, the mated coupling face of the portable device is positioned at the time of docking by being brought closer to the coupling face of the docking-type function-providing apparatus so that the connector of the device is aligned with and connected to the connector of the apparatus. At this time, if the guided face of the portable device is fitted to the guide face of the apparatus, positioning between the connectors can be easily performed. In different models of portable devices, the distance between the device connector and the mated guided face may vary. In some cases, therefore, there is a possibility of failure to suitably use the guide face of the apparatus.

For example, in a case where different models of portable PCs 101 and 102 are docked with the same conventional docking stations 107 as shown in (a) and (b) of FIG. 10, connectors 103 and 104 of the portable PCs 101 and 102 are at different distances from the guided faces 105 and 106 at the ends of the portable PCs. In this case, the distance between the connector 108 and the guide face 109 in the conventional docking station 107 is suitable for the potable PC 102. Therefore, if the guided face 106 is fitted to the guide face 109, the connector 104 of the PC can be easily aligned with the connector 108 of the station, as shown in (b) of FIG. 10. On the other hand, the distance between the connector 108 and the guide face 109 is not suitable for the potable PC 101. The guide face 109 cannot be used for the PC 101 and a space occurs between the guide face 109 and the guided face 105 as shown in (a) of FIG. 10 when the connector 103 of the PC and the connector 108 of the station are positioned for alignment therebetween. It is difficult to align the connectors 103 and 108 with each other and the performance of the apparatus is disadvantageously low in handling. In this case, a need arises to separately prepare a docking station adaptable to the portable PC 101 or to use an adapter or the like to solve the problem.

According to the present invention, the position of the guide face can be changed in a direction intersecting the guide face. Therefore the apparatus of the present invention can be adapted to a plurality of different models of the portable device by changing the position of the guide face according to each model.

In a preferred mode of the present invention, the guide face of the docking-type function-providing apparatus is constituted by a first guide face fixed on the apparatus and a second guide face provided between the first guide face and the connector of the apparatus so as to be storable. For example, as shown in FIG. 11, the second guide face is formed so as to be storable under a coupling face 111 of a docking-type function-providing apparatus 113 by being rotated about a rotation axis 114 parallel to the coupling face 111. That is, a plate-like member 115 having the rotation axis 114 parallel to the coupling face 111 and a first guide face 112 is provided under the coupling face 111, and the surface of the plate-like member 115 opposite from the first guide face 112 is formed as a second guide face 116. When the portable PC 101 in which the distance between the connector 103 and the guided face 105 is short as shown in (a) of FIG. 10 is docked, the plate-like member 115 is fixed after being rotated to become perpendicular to the coupling face 111 as indicated by arrow 117, and the second guide face 116 is used. When the portable PC 102 in which the distance between the connector 104 and the guided face 106 is long as shown in (b) of FIG. 10 is docked, the plate-like member 115 is stored under the coupling face 111 and the first guide face 112 is used. Thus, each potable PC can be docked by easily aligning the connector 103 or 104 with the connector 108 of the apparatus.

The second guide face 116 may be formed by a plate-like member 121 movable in a direction intersecting the coupling face 111 as shown in FIG. 12, instead of being formed by the plate-like member 115. The plate-like member 121 may be stored under the coupling face 111 by being moved in a direction 127 intersecting the coupling face 111. Also in this case, the first and second guide faces are selectively used according to models of portable PCs to enable docking to be easily performed no matter what the model is.

In another preferred mode of the present invention, a movable portion 133 such as shown in FIG. 13 may be provided which has a guide face 132 and are mounted so as to be movable in a direction intersecting the guide face 132. Preferably, the movable portion 133 is urged so that the guide face 132 is moved in the direction of the connector 108 of the apparatus, and the movable portion 133 is positioned by being stopped in any of two or three or more predetermined positions in the direction of its movement against the urging force.

In this case, docking of the portable PC 101 in which the distance between the connector and the guided face is short is performed after setting the docking-type function-providing apparatus 113 so that the movable portion 133 of the apparatus is in a predetermined front position, as shown in (a) of FIG. 14. On the other hand, for docking of the portable PC 102 in which the distance between the connector and the guided face is long, the movable portion 113 may be set in a predetermined rear position, as shown in (b) of FIG. 14.

In this case, if the portable device is a predetermined model, the movable portion may be released from the stopped state according to coupling between the coupling face of the apparatus and the mated coupling face of the device to enable the guide face to be moved in the direction of the connector of the apparatus. Such release means may be formed, for example, by using a model detecting projection 152 provided so as project above the coupling face 111 of the docking-type function-providing apparatus 113, as shown in FIG. 15. That is, the arrangement is such that at the time of docking of the portable PC 101 in which the distance between the connector of the device and the guided face is short, a mated coupling face 154 depresses the projection 152, as shown in (a) of FIG. 15, and that at the time of docking of the portable PC 102 in which the distance between the connector of the device and the guided face is long, the projection 152 is not depressed because a recess 156 is provided in a corresponding portion of a mated coupling face 155. Thus, the two models can be discriminated from each other and the movable portion 133 can be maintained in the stopped state or released from the stopped state according to the models. When the movable portion 133 is released from the stopped state, the movable portion 133 is moved in the direction 134 of the connector of the apparatus. However, it is stopped at the next stop position against the urging force.

Further, as shown in FIG. 16, the movable portion 133 may alternatively have a flap 161 capable of rotating so that its one end faces in a direction opposite to the direction in which a coupling face 151 faces, the one end of the flap 161 constituting the whole or part of the guide face 132, the other end of the flap 161 being rotatably connected to the main body of the movable portion 133 through a rotary shaft 162. When a portable PC 163 is equipped with an ordinary battery, docking is performed without rotating the flap 161, as shown in (a) of FIG. 16. When the portable PC 163 is equipped with a large battery 164, docking is performed while the flap 161 is rotated by a battery 164 portion, as shown in (b) of FIG. 16, thus avoiding interference with the battery 164 portion.

As a means for urging the movable portion so that the movable portion moves in the direction of the connector of the apparatus, an urging means may be adopted which has a translating member mounted on the stationary portion of the apparatus so as to be movable in directions substantially parallel to the guide face and the coupling face, a tensile coil spring provided between the translating member and the stationary portion, and a pair of rotating members each rotatably connected to the translating member and the movable member so as to form a parallel link including the translating member and the movable member as nodes. In this case, if the movable portion having the above-described flap is used, the arrangement may be such that each rotating member has a projection outside the position at which it is mounted to the movable portion, and the projection is positioned at such an angle as to be parallel to the rotation axis of the flap and in such a position as not to obstruct the rotation of the flap when the guide face is in a predetermined position remoter from the connector of the apparatus, and is positioned so as to have a predetermined angle from the rotation axis of the flap, support the flap and check the rotation of the flap when the guide face is in a predetermined position closer to the connector of the apparatus.

As another means for urging the movable portion so that the movable portion moves in the direction of the connector of the apparatus, an urging means may be adopted which has a pair of lever members intersecting each other in an X-shaped form and rotatably connected to each other, and a tensile coil spring provided between ends of the two lever members, the lever members being rotatably mounted at their point of intersection to the stationary portion of the apparatus, the other ends of the lever members being mounted to the movable portion so as to be rotatable and movable along the lengthwise directions of the members.

A portable device in accordance with the present invention is capable of being docked with a portable device having a projection 152 such as that described above with reference to FIG. 15 and has a recess corresponding to the projection 152.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
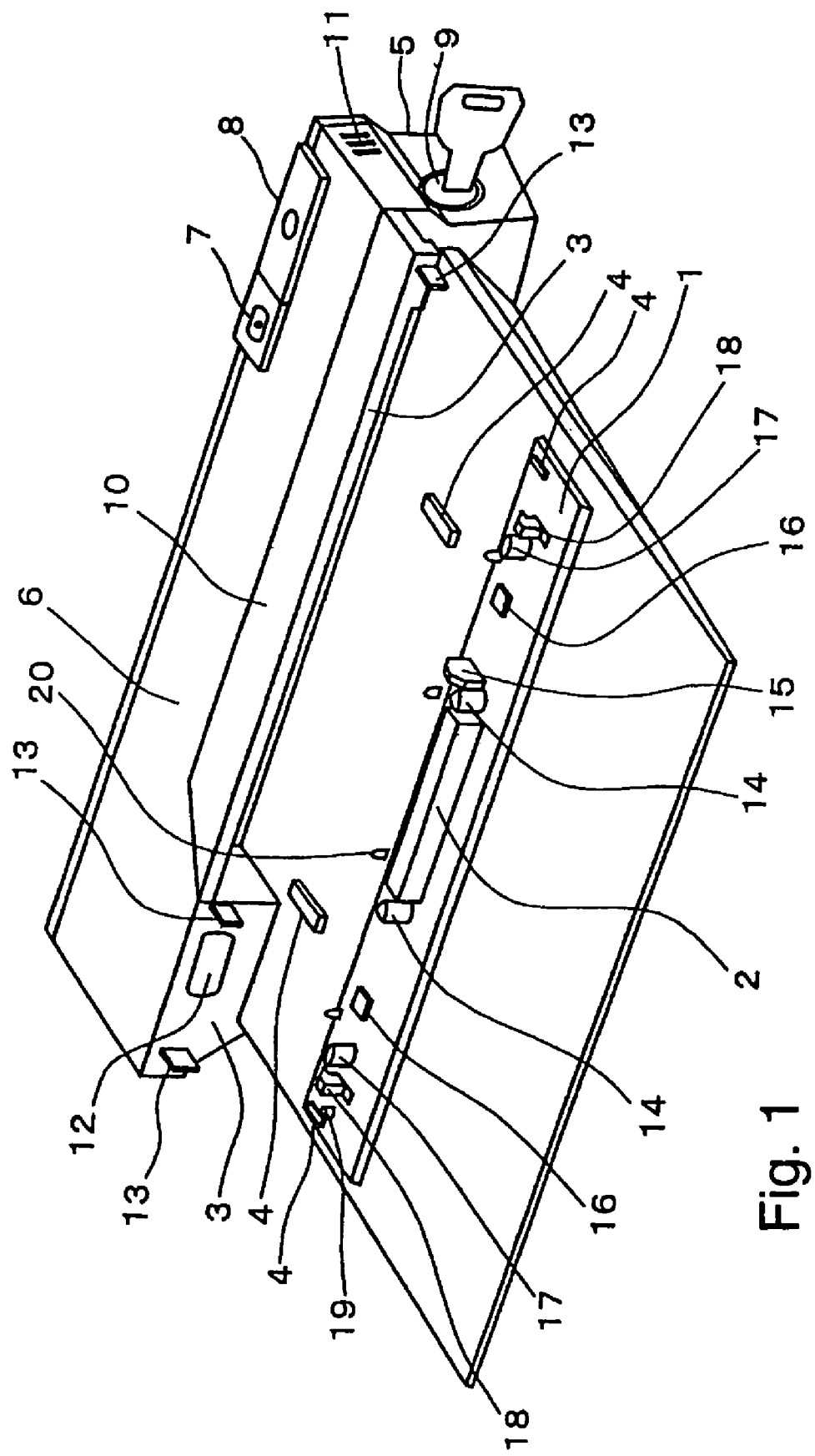
FIG. 1 is a diagram showing an appearance of a docking-type port replicator which represents an embodiment of the present invention.

FIG. 1 shows an external appearance of a docking-type port replicator which represents an embodiment of the present invention. This port replicator provides a notebook-type personal computer (hereinafter referred to as "notebook PC") with the function of expanding ports used for connection to peripheral devices when the notebook PC is docked with the docking station. As shown in the FIG. 1, the port replicator has a coupling face 1 which couples with a bottom face of the notebook PC at the time of docking, a connector 2 provided on the docking face 1, and a guide face 3 which is generally perpendicular to the coupling face 1 and which guides a back face of the notebook PC at the time of docking with the notebook PC. The connector 2 is provided to provide the port-expanding function for the notebook PC through a connector provided on the mated coupling face of the notebook PC (hereinafter referred to as "PC connector"). The connector 2 is positioned so as to be connected to the PC connector by coupling between the coupling face 1 and the mated coupling face of the notebook PC.

The position of the guide face 3 can be changed according to the distance between the PC connector and the back face of the notebook PC. The coupling face 1 couples with the lower face of the notebook PC with elastic members 4 or the like interposed therebetween to support the weight of the notebook PC. The guide face 3 has the function of guiding the back face of the notebook PC at the time of docking to facilitate alignment of the positions of the PC connector and the connector 2, and the function of covering the back face of the notebook PC so as to prevent an RJ-11 terminal or the like in the back face of the notebook PC from being touched by a user.

The port replicator further has a stationary portion 5 fixed on the coupling face 1, and a movable portion 6 mounted so as to be movable in a direction perpendicular to the guide face 3 with respect to the stationary portion 5. The stationary portion 5 has a power switch 7, an eject button 8 for undocking, and a lock portion 9 for stopping undocking. In a housing forming the stationary portion 5 and the coupling face 1 are provided a connector 2 and circuits which are connected to connectors for various ports provided on a back face of the port replicator to provide the port expanding function, a mechanism for urging the movable portion 6, a docking mechanism for docking and undocking the notebook PC, etc.

The movable portion 6 includes a flap 10 constituting part of the guide face 3. The flap 10 is parallel to the guide face 3 and is rotatable on an axis corresponding its end opposite from the guide face 3. The flap 10 is provided for the purpose of avoiding interference with a large battery attached to the notebook PC at the time of docking with the notebook PC in such a manner that the flap 10 is rotated through ninety degrees by the battery. In this case, the upper surface of the flap 10 substantially acts as a guide face capable of guiding a battery portion of the notebook PC.

Figure 2:
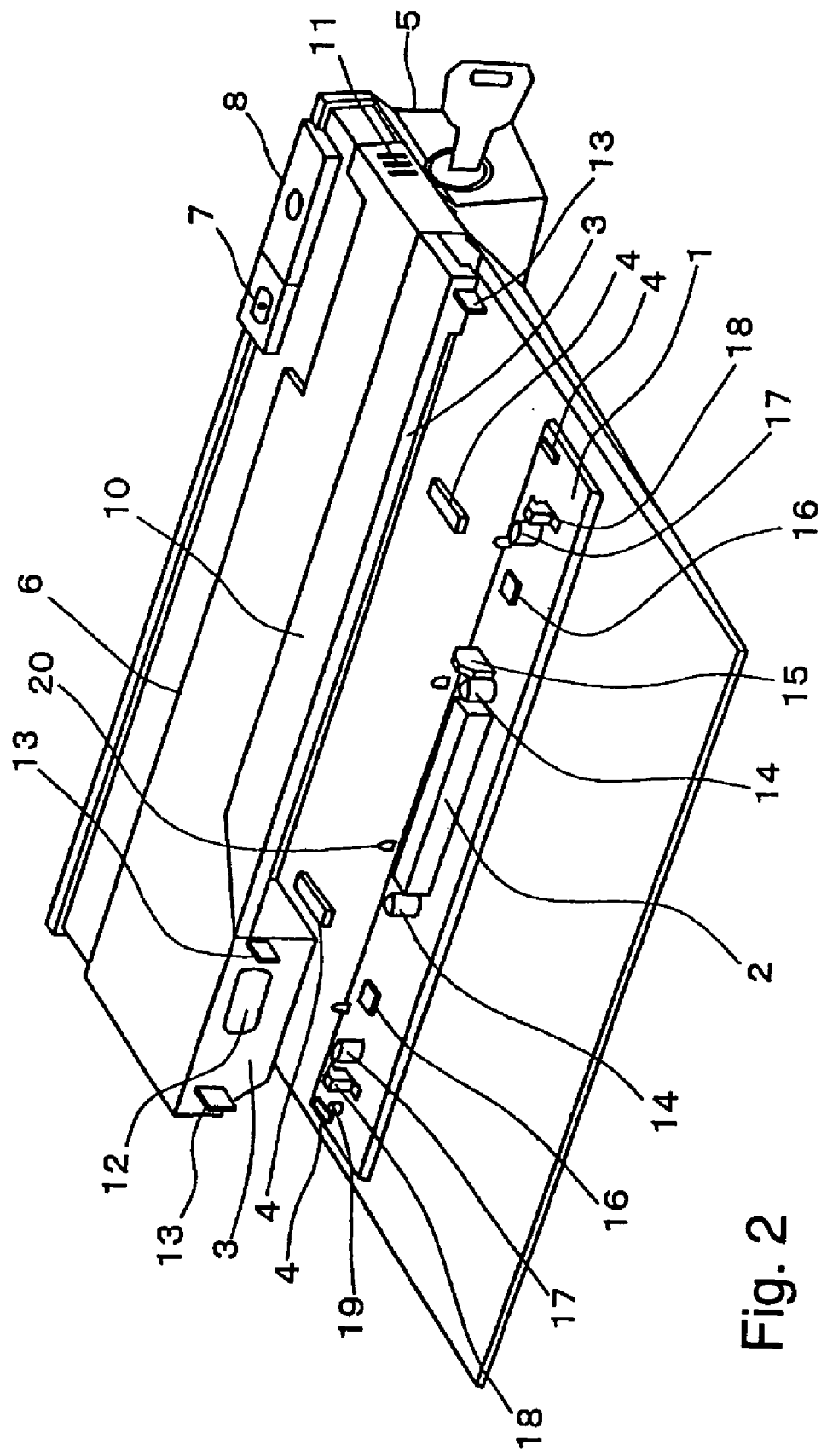
FIG. 2 is a perspective view showing a state in which a movable portion in the port replicator shown in FIG. 1 is moved to a front position.

The movable portion 6 can be moved between an inner position as viewed in FIG. 1 and a position closer to the operator side as viewed in FIG. 2. A position closer to an operator existing in such a position as to face the guide face 3 and a position remoter from the operator will be expressed by "front" and "rear", respectively, unless otherwise defined. Other terms such as "upper", "lower", "left" and "right" indicating directions will be also used with reference to the direction from the operator's position. The movable portion 6 has a recess-projection portions 11 provided at opposite ends to be held between fingers of the operator's hand when the operator slides the movable portion 6 forward, and a push portion 12 which is pushed by the thumb of the left hand to move the movable portion 6 rearward. The movable portion 6 also has guide plates 13 for positioning the notebook PC in a horizontal direction along the guide face 3. The guide plates 13 are provided at three positions: positions on the opposite sides of the pressing portion 12, and a position at the right end of the flap 10.

Members or portions provided on the coupling face 1 as well as the connector 2 are connector guides 14 provided on the opposite sides of the connector 2, a shutter-opening push plate 15 provided adjacent to the right connector guide 14 on the right-hand side of the same, undocking ejecting members 16 provided on the opposite sides of the connector 2 comparatively remote from the same, notebook PC-positioning projections 17 provided in opposite-side positions outside the undocking ejecting members 16, and docking hook-like members 18 provided in opposite-side positions outside the notebook PC positioning projections 17. A projection 19 for detecting note PC models is provided on the left-hand side of the left hook-like member 18. An earth plate 20 connected to a ground of the notebook PC is also provided to reduce EMI (electromagnetic interference) radiation noise.

The connector guides 14 guide corresponding PC portions at the time of docking so that the PC connector is connected to the connector 2 in a state of being aligned with the connector 2. The shutter-opening push plate 15 is a member for opening, at the time of docking, a shutter provided for protection of the PC connector. The shutter-opening push plate 15 is urged in an upward direction by a spring. The shutter-opening push plate 15 is moved downward when a force of a magnitude larger than a certain value is applied thereof. The undocking ejecting members 16 are projected upward according to pushing of an eject button 8 for undocking to upwardly push the mated coupling face of the notebook PC. The positioning projections 17 are used to guide corresponding recessed portions of the notebook PC at the time of docking to position the notebook PC in directions along the coupling face 1.

The hook-like members 18 are guided movably along a front-rear direction and are urged rearward by springs. The hook-like members 18 have slanting portions sloped downward along a rearward direction. The hook-like members 18 are brought into engagement with corresponding mated engaging portions of the notebook PC and fix the notebook PC on the coupling face 1 at the time of docking in such a manner that the hook-like members 18 are moved forward by the mated engaging portions sliding on the slanting portions and are then allowed to return rearward. The model detecting projection 19 is upwardly urged by a spring. The model detecting projection 19 is moved downward when pressed. When the model detecting projection 19 is moved downward, the movable portion 6 is slid to the front position by an urging mechanism described below.

In this arrangement, placement of the movable portion 6 in the rear position indicated in FIG. 1 is required to connect to the port replicator a model of a notebook PC in which the distance from the PC connector to the back face is large. To connect such a notebook PC, therefore, the movable portion 6 is previously moved to the position indicated in FIG. 1 by pressing the push portion 12 by the thumb of the left hand if the movable portion 6 is the front position shown in FIG. 2. The notebook PC is then positioned so that the back face of the notebook PC is fitted to the adaptation surface 3 and the guide plate 13 is placed in correspondence with a corresponding guided portion of the notebook PC. In this state, the notebook PC is moved downward so that the mated coupling face at the bottom of the notebook PC is brought closer to the coupling face 1. The notebook PC is thereby connected to the port replicator.

At this time, the shutter of the PC connector is pressed and opened by the push plate 15 and the PC connector is connected to the connector 2 while being guided mainly by the connector guides 14. The entire notebook PC is positioned in horizontal directions by the projections 17. The hook-like members 18 are temporarily pushed out forward by the corresponding mated engaging portions of the notebook PC and then recede to engage with the mated engaging portions. The mated coupling face of the PC is thereby fixed on the coupling face 1. The earth plate 20 is connected to the ground of the notebook PC. The portion of the notebook PC corresponding to the model detecting projection 19 is a recessed portion which does not depress the model detecting projection 19. Therefore the movable portion 6 stays in the rear position without being slid.

Figure 3:
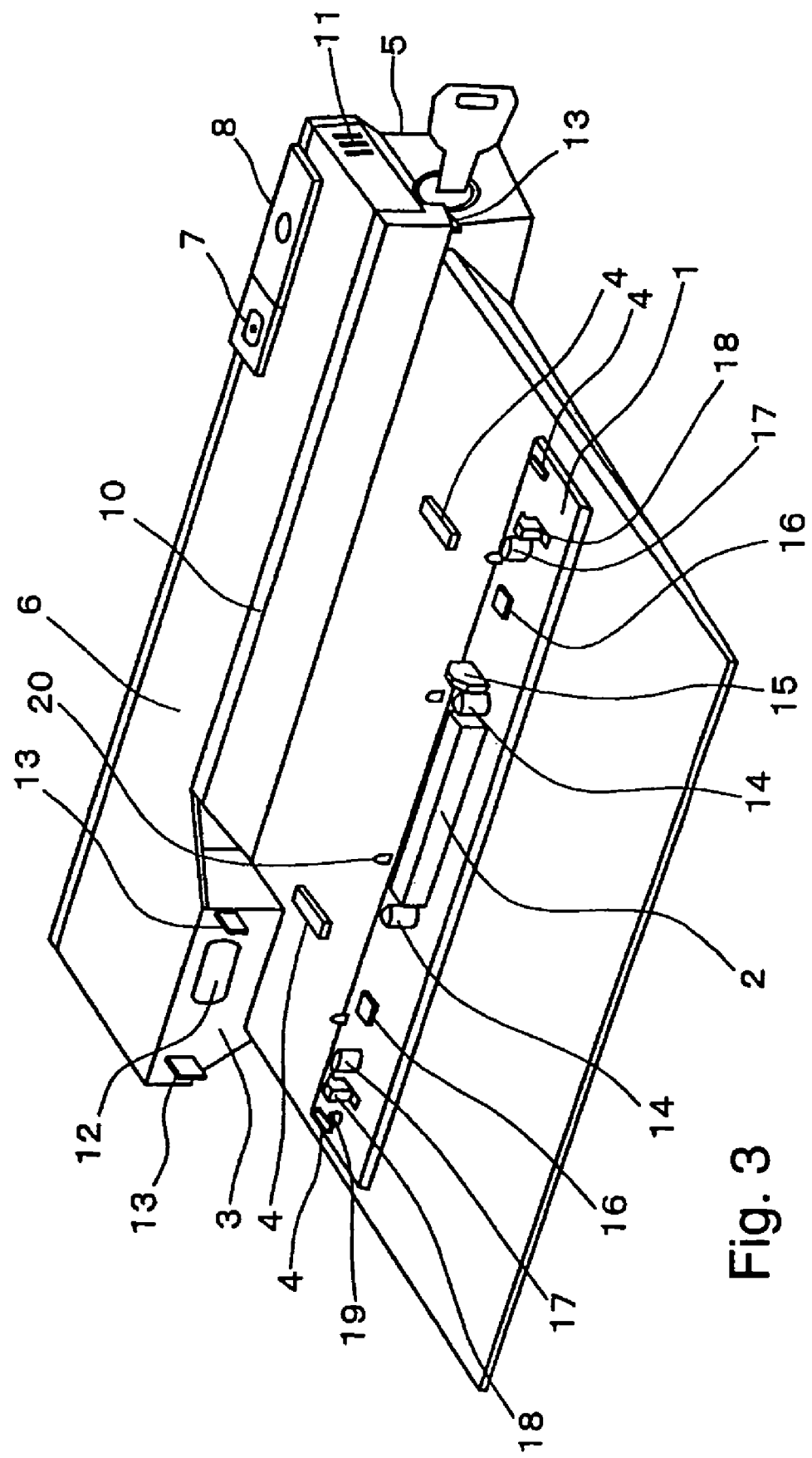
FIG. 3 is a perspective view showing a state in which a flap in the port replicator shown in FIG. 1 is rotated.

Even in a case where the notebook PC is such a model that the distance from the PC connector to the back face is long and where the notebook PC is equipped with a large battery, docking can be performed by the same procedure. In such a case, however, the flap 10 is rotated by being pressed downward by a battery portion to be set in a state shown in FIG. 3 when the notebook PC is placed on the coupling face 1. Thus, docking can be performed without interference between the battery and the movable portion 6.

For docking of a model of a notebook PC in which the distance from the PC connector to the back face is short, placement of the movable portion 6 in the front position indicated in FIG. 2 is ordinarily required. In a case where the movable portion 1 is in the rear position indicated in FIG. 1, the movable portion 1 is manually slid to the front position by placing, for example, the middle fingers of the two hands on the recess-projection portions 11. Operations described may then be performed, as in the above-described case. That is, the notebook PC is positioned so that the back face of the notebook PC is fitted to the adaptation surface 3 and the guide plate 13 is placed in correspondence with the corresponding guided portion of the notebook PC, as described above. In this state, the notebook PC is moved downward until the mated coupling face at the bottom of the notebook PC is brought closer to the coupling face 1 and fixed by the hook-like members 18.

In a case where the notebook PC is placed on the coupling face 1 without sliding the movable portion 6 to the front position when the movable portion 6 is in the rear position, the model detecting projection 19 is depressed by the reverse face of the notebook PC with no recess at the corresponding position. The movable portion 6 is then slid automatically to the front position to cover the back face of the notebook PC with the guide face 3. This is for the purpose of preventing the RJ-11 terminal or the like in the back face of the notebook PC from being inadvertently touched by an operator's finger or the like.

Figure 4:
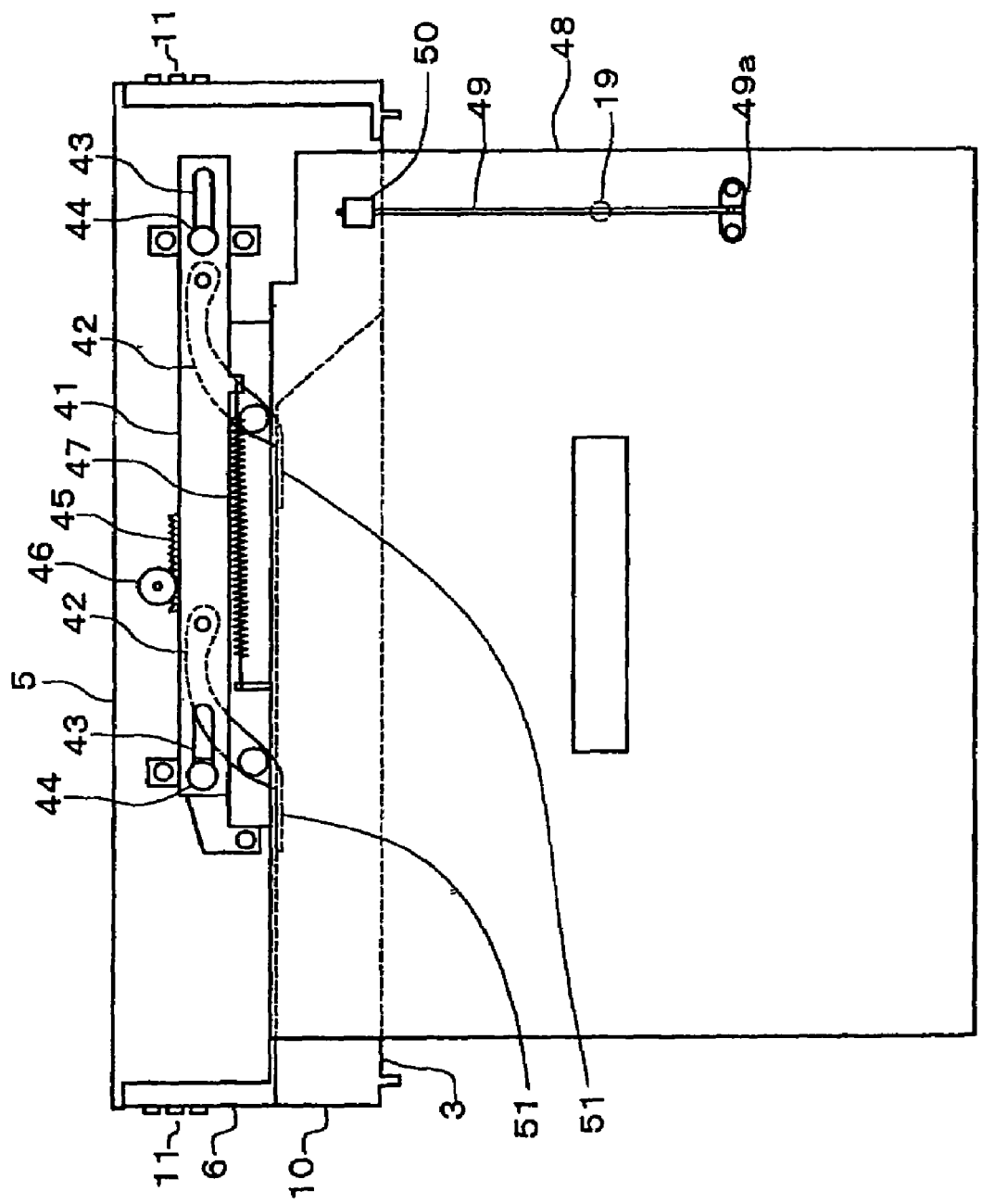
FIG. 4 is a plan view of a mechanism for urging the movable portion in the port replicator shown in FIG. 1.

FIG. 4 is a plan view of an upper portion of the stationary portion 5, the movable portion 6 and a portion constituting the coupling face disassembled and seen from the reverse side, showing a mechanism for urging the movable portion 6. FIG. 4 shows a state where the movable portion 6 in the rear position. The movable portion 6 is urged by a link mechanism such as shown in the figure so as to be moved from the rear position to the front position. In this link mechanism, the movable portion 6, a plate 41 provided on the stationary portion 5 and two rotating members 42 each having its one end and the other end rotatably fixed respectively to the movable portion 6 and the plate 41 form a parallel link. The plate 41 has elongated holes 43 formed in its opposite end portions. The elongated holes 43 are elongated in a direction parallel to the guide face 3. The plate 41 is mounted to the stationary portion 5 by fixing pins 44 passed through the elongated holes 43. That is, the plate 41 is guided so as to be movable in a direction parallel to the guide plate 3.

The plate 41 has a rack 45 formed along the direction of its movement. The rack 45 and a pinion 46 fixed on the stationary portion 5 so as to mesh with the rack 45 constitute an oil damper for providing the effect of damping a force applied to the plate 41. A tensile coil spring 47 for urging the plate 41 rightward (leftward as viewed in FIG. 4) is provided between the plate 41 and the stationary portion 5. That is, the movable portion 6 is thereby urged toward the front position through the link mechanism.

A member 48 shown in the figure constitutes the coupling face 1. One end 49a of a rod 49 formed of an elastic material is fixed on the member 48. The other end of the rod 49 is urged in an upward direction (in a direction toward a remoter position as viewed in the figure) by a spring provided between the rod 49 and a member 50 fixed on the member 48. A projecting member capable of being fitted in a recess formed in the movable portion 6 is provided on the rod 49 opposite from this spring. In the state shown in FIG. 4, the projecting member is in a position corresponding to the recess. In this state, therefore, the projecting member urged by the spring and the rod 49 is in a state of being fitted in the recess. That is, the projecting member stops the movable portion 6 against the forward urging force to position the movable portion 6 in the rear position. When the model detecting projection 19 is depressed, it presses an intermediate portion of the rod 49 downward to position the same in such a position that the recess of the movable portion 6 and the projecting member on the end portion of the rod 49 can be released from the fitted state.

When in the state shown in FIG. 4 a force is applied in a frontward direction to the movable portion 6 through the recess-projection portions 11 formed at the opposite sides, the recess of movable portion 6 is moved in the frontward direction. The projecting member on the end portion of the rod 49 is thereby moved downward against the urging force applied by the spring and the rod 49 to be released from the state of being fitted in the recess of the movable portion 6. The movable portion 6 is then slid automatically to the front position by the urging force of the spring 47. In the state shown in FIG. 4, if a model of a notebook PC in which the distance from the PC connector to the back face is short is directly placed on the coupling face 1, the model detecting projection 19 is depressed by the lower surface of the notebook PC to automatically release the projecting member on the end portion of the rod 49 and the recess of the movable portion 6 from the fitted state, thereby allowing the movable portion 6 to be moved automatically to the front position.

Figure 5:
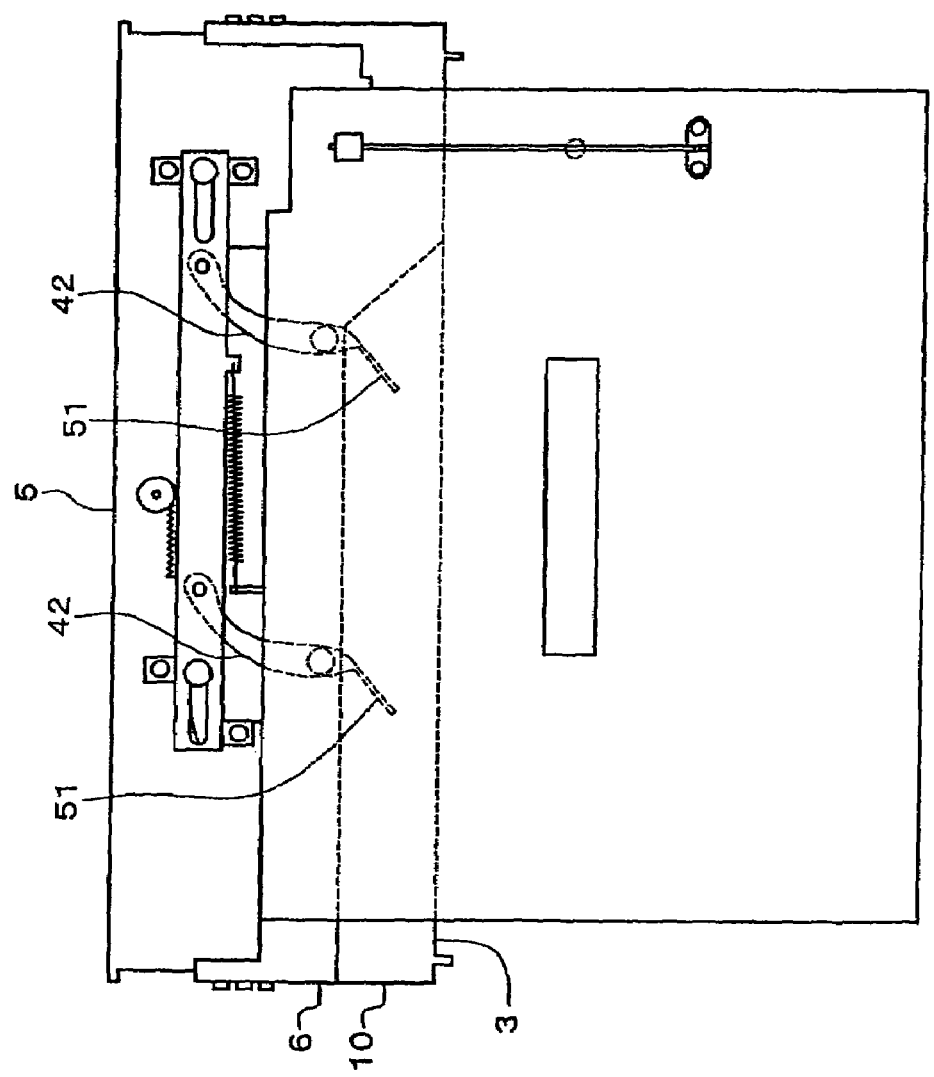
FIG. 5 is a plan view showing a state in which the movable portion is moved to the front position in the urging mechanism shown in FIG. 4.

FIG. 5 shows a state of the urging mechanism when the movable portion 6 is in the front position. Projecting portions 51 are provided on an ends of the rotating members 42 on the movable portion 6 side so that their upper ends coincides with the level of the reverse surface of the flap 10, as shown in FIG. 5. The projecting portion 51 is provided such that it makes a large angle to the guide face 3 when the movable portion 6 is in the front portion. In the state shown in FIG. 5, therefore, the flap 10 is stopped from rotating by the projecting portions 51. In the state shown in FIG. 4, i.e., the state where the movable portion 6 is in the rear position, the projecting portions 51 are in a receding position along the axis of rotation of the flap 10 and parallel to the axis of rotation, and do not obstruct the rotation of the flap 10.

Figure 6:
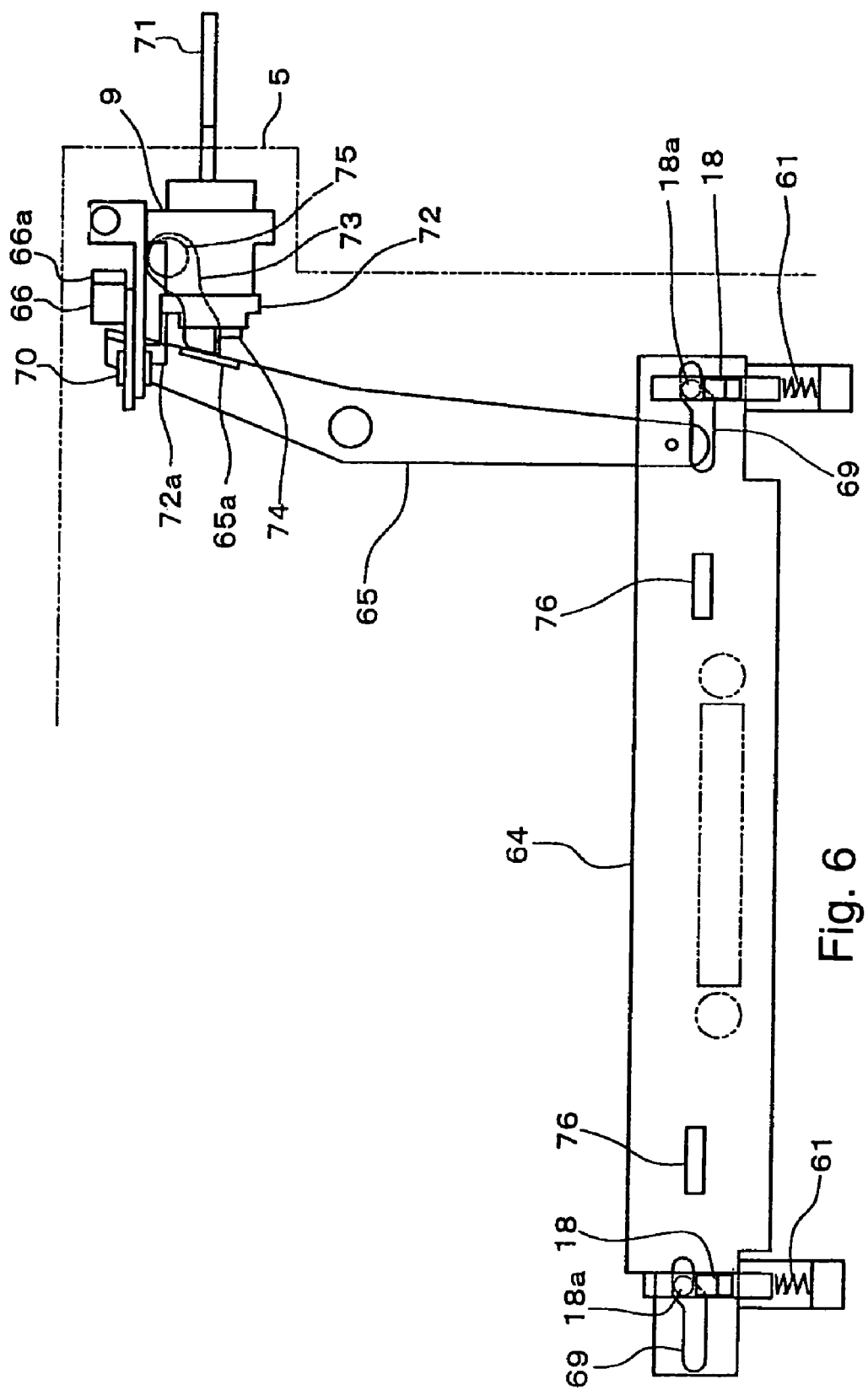
FIG. 6 is a plan view of a docking mechanism in the port replicator shown in FIG. 1.

FIG. 6 shows the docking mechanism for docking the notebook PC on the coupling face 1 by the hook-like members 18 and for undocking the notebook PC. This mechanism has springs 61 for urging the hook-like members 18 in a rearward direction, a moving member 64 for controlling the positions of the hook-like members 18 in a front-rear direction, a rotating lever 65 for controlling the position of the moving member 64 in a left-right direction, and a release member 66 for rotating the rotating lever 65 for undocking.

Each of the springs 61 has its one end fixed to the stationary portion 5 and the other end connected to the hook-like member 18 and urges the hook-like member 18 to the rearward direction. In the moving member 64, cam slits 69 for driving cam followers 18a fixed to lower portions of the hook-like members 18 are provided. The moving member 64 has slanting members 76 which engage with rollers provided under the ejecting members 16 (FIG. 1). When the moving member 64 moves rightward from the position indicated in FIG. 6, the slanting members 76 cause the ejecting members 16 through the rollers to project above the coupling face 1.

The rotating lever 65 extends generally along a front-rear direction, is rotatably fixed generally at a middle position to the stationary portion 5, and has its front end portion rotatably fixed to a right end portion of the moving member 64. The release member 66 is fixed to the stationary portion 5 so as to be rotatable on a shaft 70 in a plane perpendicular to the front-rear direction. A right-hand portion 66a of the release member 66 is positioned at such a position that it can be pushed downward by depression of the eject button 8 (FIG. 1). When the release member 66 is rotated by this downward push, it pushes a rear end portion of the rotating lever 65 leftward.

The lock portion 9 has a rotating portion 72 which rotates by following turning of a key 71 inserted in the lock portion 9. When the key 71 is turned clockwise through ninety degrees from the state shown in FIG. 6, the rotating portion 72 rotates through ninety degrees in the same direction. The rotating portion 72 has a locking member 72a which checks substantially in a rightward direction a portion 65a fixed on the rotating lever 65 in the vicinity of a rear portion of the same and blocks the rotation of the rotating lever 65 when the rotating portion 72 is rotated through ninety degrees from the state shown in FIG. 6, and a supporting portion 74 which supports the portion 65a of the rotating lever 65 by pressing the portion 65a substantially in a leftward direction through a rotating member 73 in the state shown in FIG. 6. The rotating member 73 is rotatably fixed on the stationary portion 5 by a rotary shaft 75, and is urged by a spring in a direction for pressing the portion 65a of the rotating lever 65.

Figure 7C:
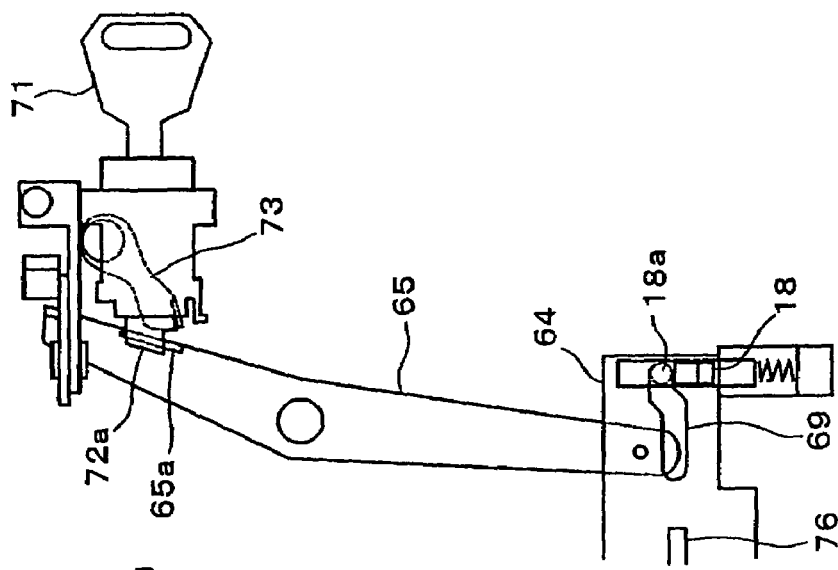
FIG. 7 is a diagram showing the operation of the docking mechanism shown in FIG. 6.
Figure 7B:
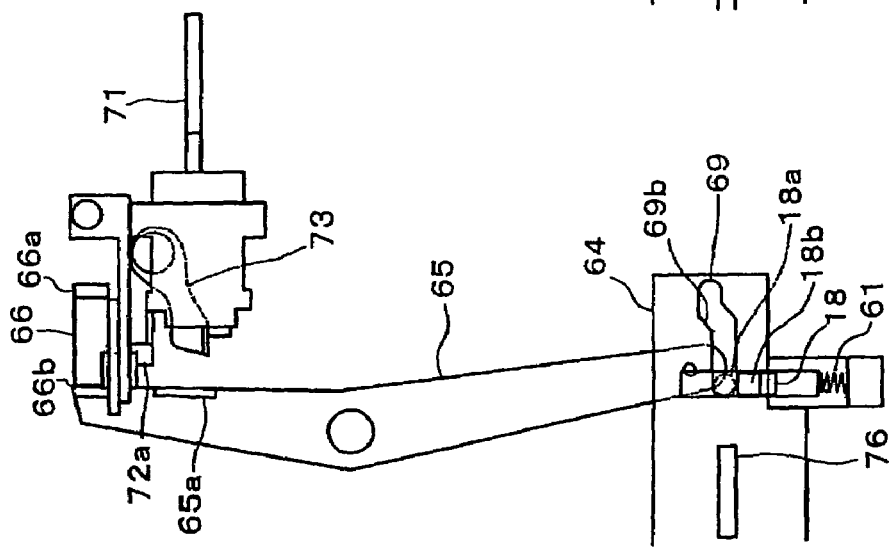
Figure 7A:
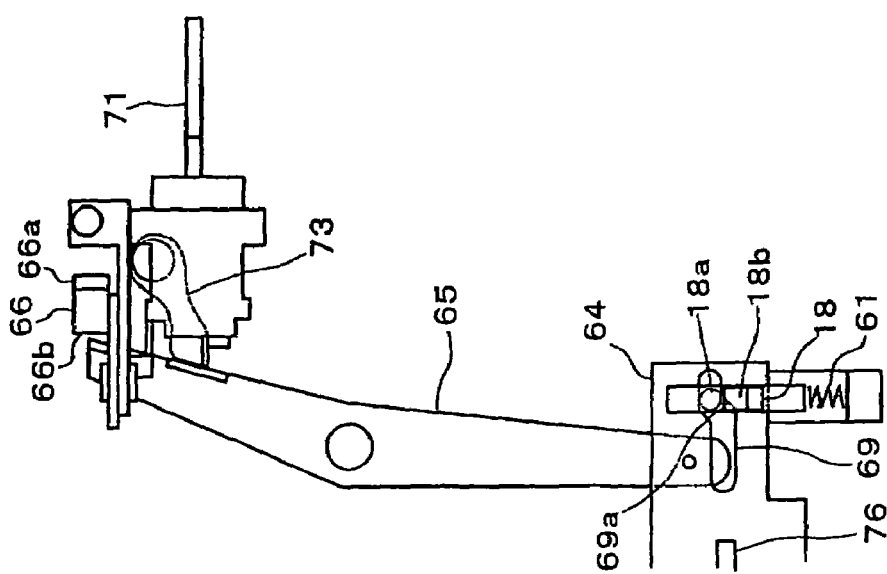

FIG. 7 shows the operation of the docking mechanism. Before docking, the position of each cam follower 18a relative to the cam slit 69 is an intermediate position in a position range in which it can be set, as shown in (a) of the figure. When in this state the mated coupling face of the notebook PC is brought closer to the coupling face 1 for docking, the hook-like members 18 are moved forward by sliding between the mated engaging portions of the notebook PC and the slanting portions 18b of the hook-like members 18. At this time, the moving member 64 and the rotating lever 65 are slightly moved by the action of the cam followers 18a on slanting portions 69a of the cam slits 69. When engagement of the hook-like members 18 with the mated engaging portions of the notebook PC is completed, the hook-like members 18 are moved rearward by the urging forces of the springs 61. Docking is thereby completed and the docking mechanism returns to the state shown in (a) of the figure.

When the eject button 8 (FIG. 1) is depressed while the notebook PC is in the docked state, the eject button 8 pushes the right-hand portion 66a of the release member 66 downward to rotate the release member 66. A lower end portion 66b of the release member 66 then presses the rear end of the rotating lever 65 leftward. The moving member 64 is thereby moved rightward to set the docking mechanism in a state shown in (b) of FIG. 7. During this operation, the hook-like members 18 are moved forward with the movement of the moving member 64 by the action of the slating portions 69b of the cam slits 69 on the cam followers 18a. The hook-like members 18 are thereby disengaged from the mated engaging portions of the notebook PC. As the moving member 64 is further moved rightward, the slanting members 76 cause the ejecting members 16 (FIG. 1) to project from the coupling face 1 and pushes the mated coupling face of the notebook PC upward. The PC connector and the connector 2 on the apparatus side are disconnected from each other to complete undocking. When depression of the eject button 8 is stopped, the docking mechanism returns to the state shown in (a) of FIG. 7.

When the key 71 is turned through ninety degrees while the notebook PC is in the docked state, a transition of the state of the docking mechanism from the state shown in (a) of FIG. 7 to the state shown in (c) of FIG. 7 is made. That is, the locking member 72a releases the portion 65a of the rotating lever 65 from the state of being supported by the rotating member 73, checks the portion 65a in a rightward direction and moves the rear end of the rotating lever 65 rightward. The moving member 64 is thereby moved leftward to position the cam followers 18a at the right ends of the cam slits 69. That is, the docking state is locked. Under this condition, the rotating lever 65 cannot be rotated by depressing the eject button 8, and the hook-like members 18 maintain the predetermined rear position to ensure that docking of the notebook PC cannot be undone. In this locked state, the key 71 can be pulled out. Thus, it is possible to prevent the notebook PC from being detached from the port replicator.

Figure 8:
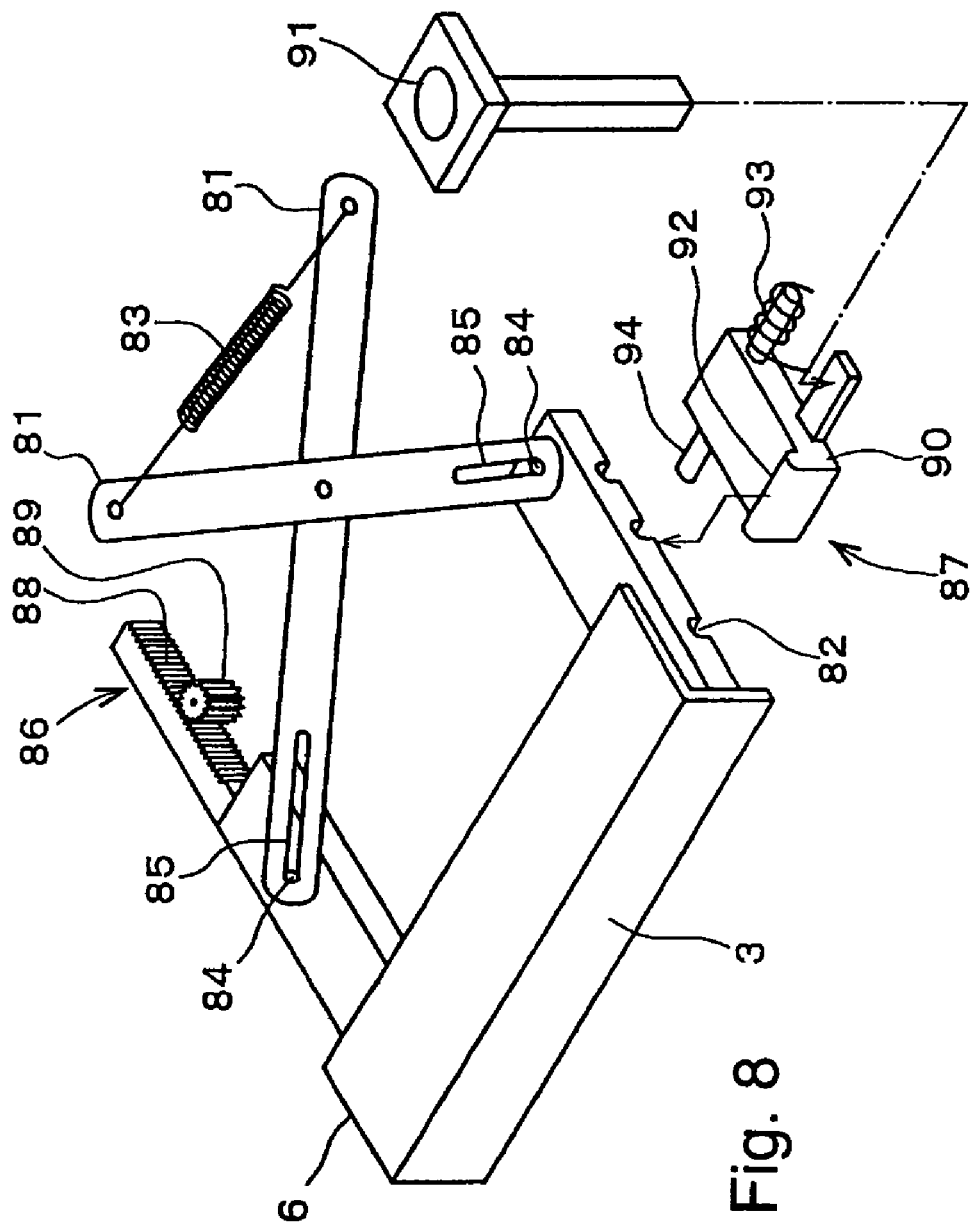
FIG. 8 is a perspective view of another form of the urging mechanism in the port replicator shown in FIG. 1.

FIG. 8 shows another example of implementation of the urging mechanism for urging the movable portion 6. This urging mechanism has two lever members 81 connected to each other in an X-shaped form and each having one end connected to the movable member 6, a tensile coil spring 83 provided between the other ends of the lever members 81, a damper mechanism 86 which damps the movement of the movable portion 6, and a positioning mechanism 87 which positions the movable portion 6.

Portions of the lever members 81 connected to each other are rotatably fixed on the stationary portion of the port replicator by a rotary shaft. An elongated hole 85 is formed in one end portion of each lever member 81 so as to extend in the lengthwise direction of the member. Pins 84 engageable with the elongated holes 85 are fixed on the movable portion 6. That is, the lever members 81 and the movable portion 6 are connected to each other so as to be able to rotate and translate. The damper mechanism 86 has a rack 88 formed on the movable portion 6 along the direction of movement of the movable portion 6, and a pinion 89 fixed on the stationary portion of the port replicator so as to mesh with the rack 88. Oil is applied to the pinion 89 to provide the function of damping a torque. The spring 83 urges the lever members 81 in such directions that the other ends of the lever member 81 pull each other.

The positioning mechanism 87 has a rotating portion 90 rotating on a rotary shaft 94, and a push button 91 for pushing the rotating portion 90 downward. The rotating portion 90 has a projection 92 capable of engaging with each of three grooves formed in the movable portion 6 at different positions in the front-rear direction, and a spring 93 which urges the rotating portion 90 in such a rotating direction that the projection 92 is moved upward.

In this arrangement, when the push button 91 is pressed to disengage the projection 92 and one of the grooves 82 from each other, the elongated holes 85 of the lever members 81 are moved by the spring 83 in such directions as to be closer to each other. At this time, the pins 84 of the movable portion 6 move forward by following the movements of the elongated holes 85. When the movable portion 6 is moved rearward against the urging force of the spring 83, the two elongated holes 85 move reversely in such directions as to be remoter from each other by following the pins 84. The combination of these forward and rearward movements and depression of the push button 91 and returning of the push button 91 from the depressed state are selected to engage the projection 92 with the desired one of the grooves 82, thus positioning the movable portion 6 at the position corresponding to one of the grooves 82.

Figure 9:
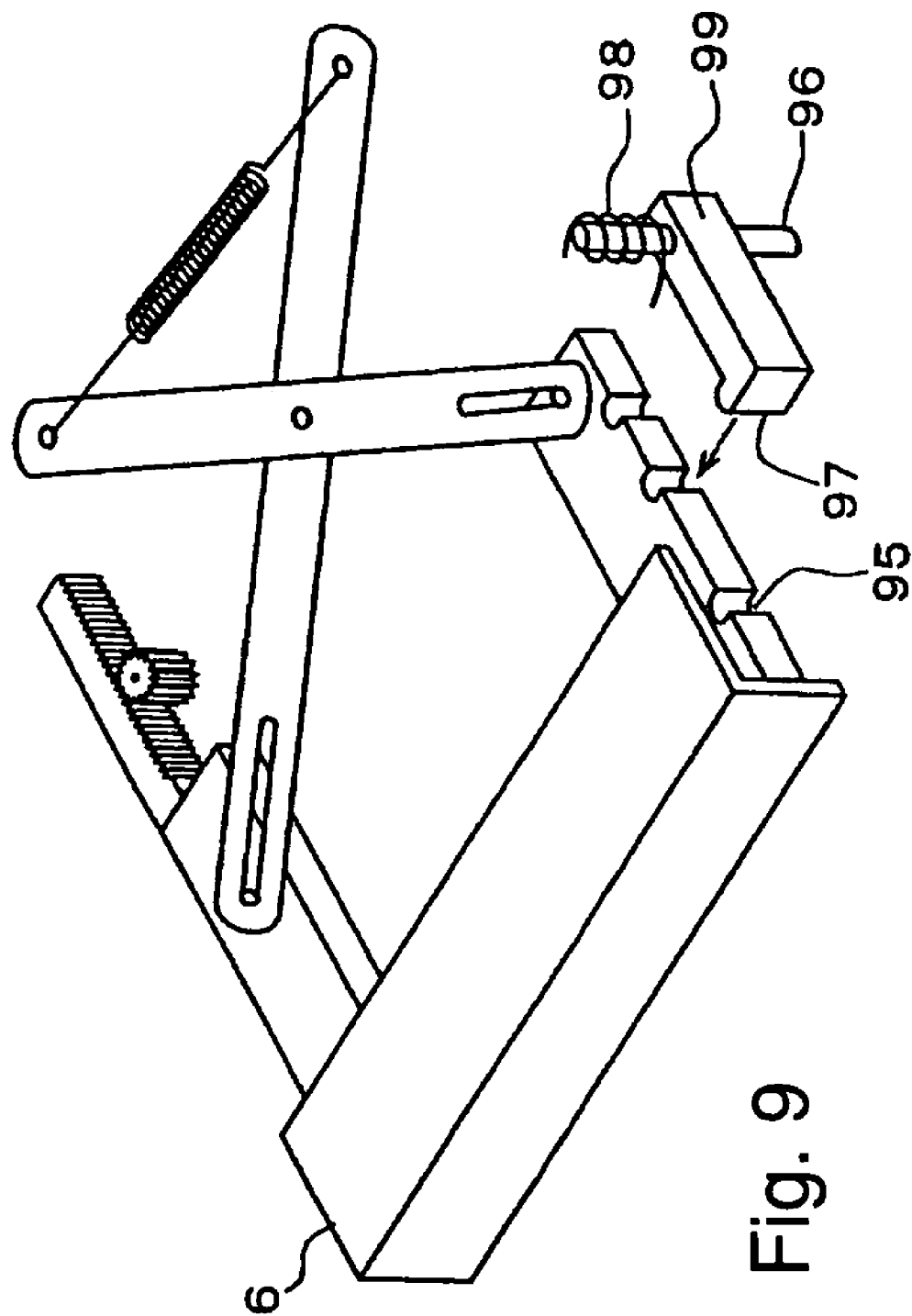
FIG. 9 is a perspective view of still another form of the urging mechanism in the port replicator shown in FIG. 1.
Figure 10A:
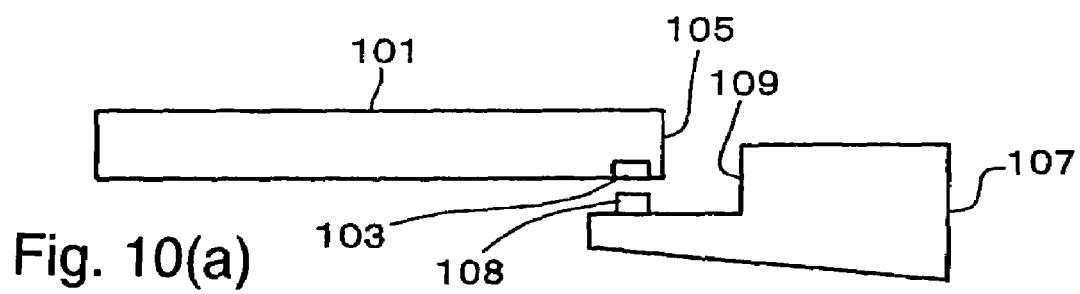
FIG. 10 is a diagram showing a problem in a case where the conventional docking-type function-providing apparatus is applied to a plurality of models of portable devices.
Figure 10B:
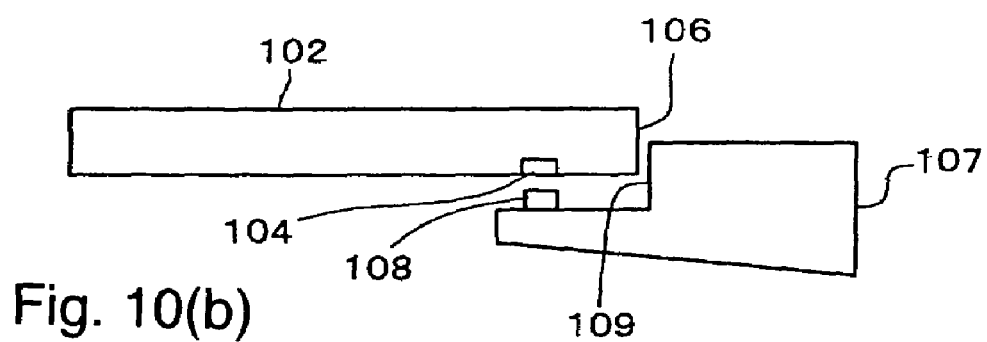
Figure 11:
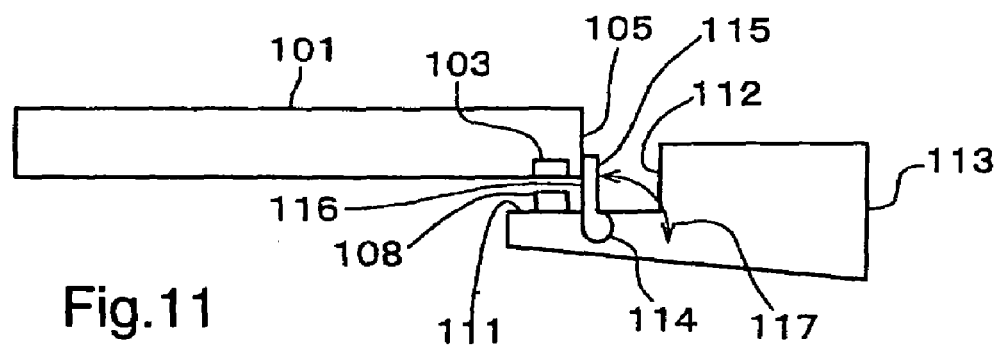
FIG. 11 is a diagram showing a docking-type function-providing apparatus in one mode of the present invention.
Figure 12:
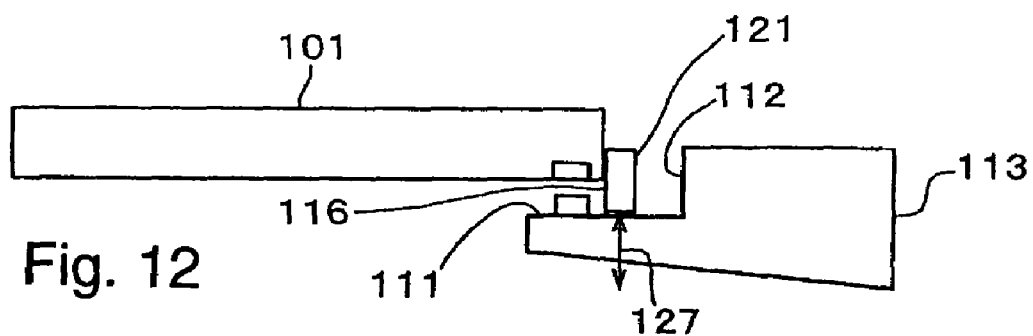
FIG. 12 is a diagram showing a docking-type function-providing apparatus in another mode of the present invention.
Figure 13:
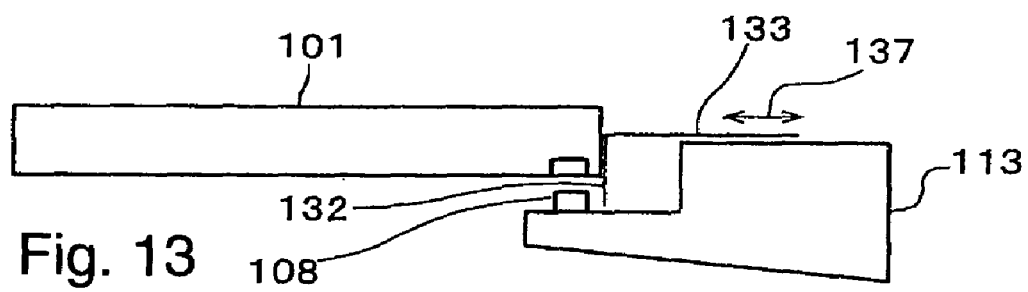
FIG. 13 is a diagram showing a docking-type function-providing apparatus in still another mode of the present invention.
Figure 14A:
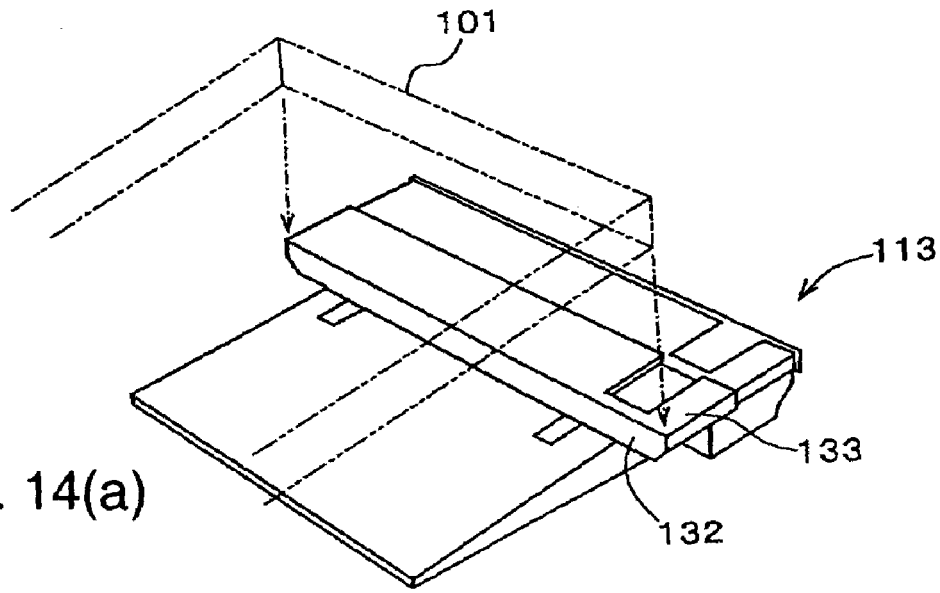
FIG. 14 is a diagram showing a state of docking performed by using the docking-type function-providing apparatus in the mode shown in FIG. 13.
Figure 14B:
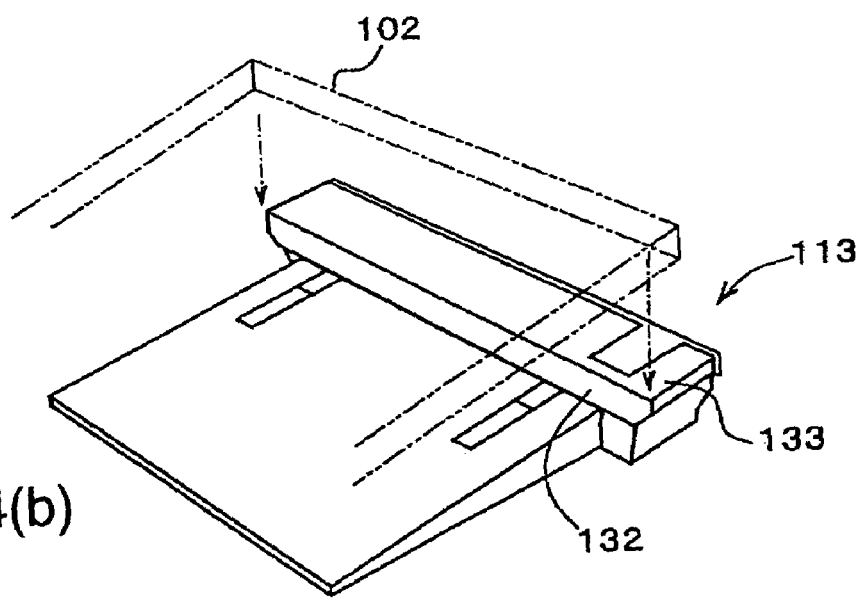
Figure 15A:
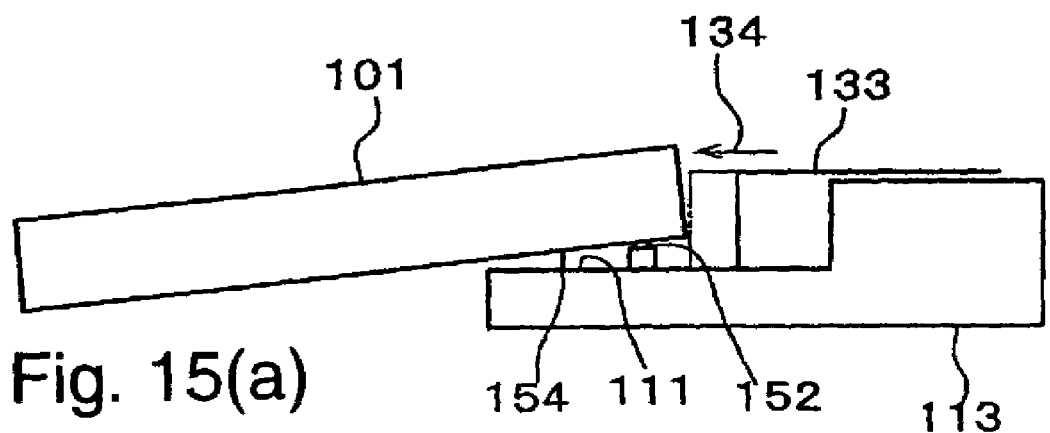
FIG. 15 is a diagram showing a state of docking performed by using a docking-type function-providing apparatus in a preferred mode of the present invention.
Figure 15B:
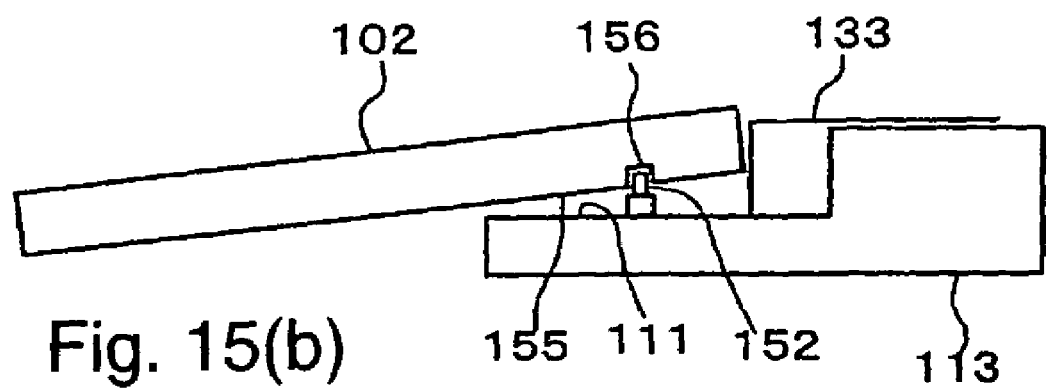
Figure 16A:
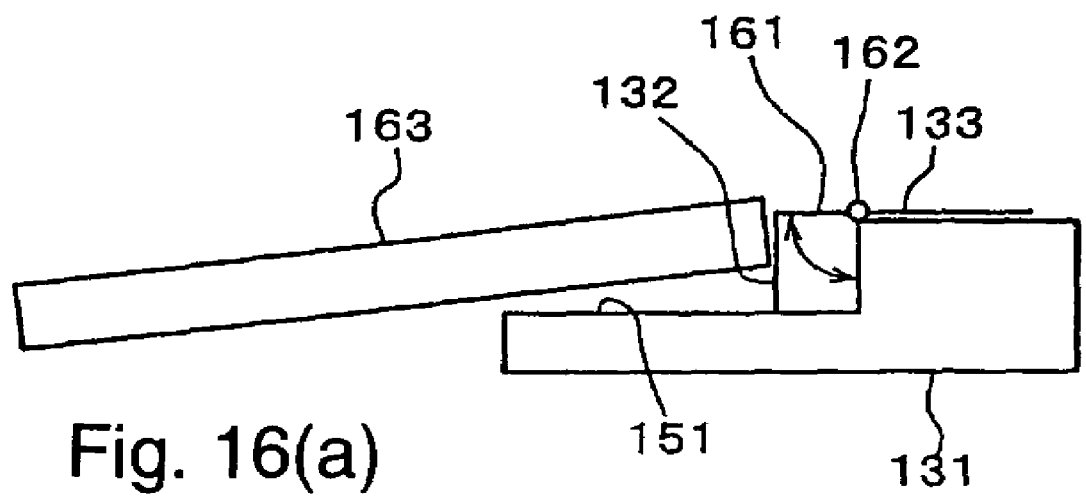
FIG. 16 is a diagram showing a state of docking performed by using a docking-type function-providing apparatus in another preferred mode of the present invention.
Figure 16B:
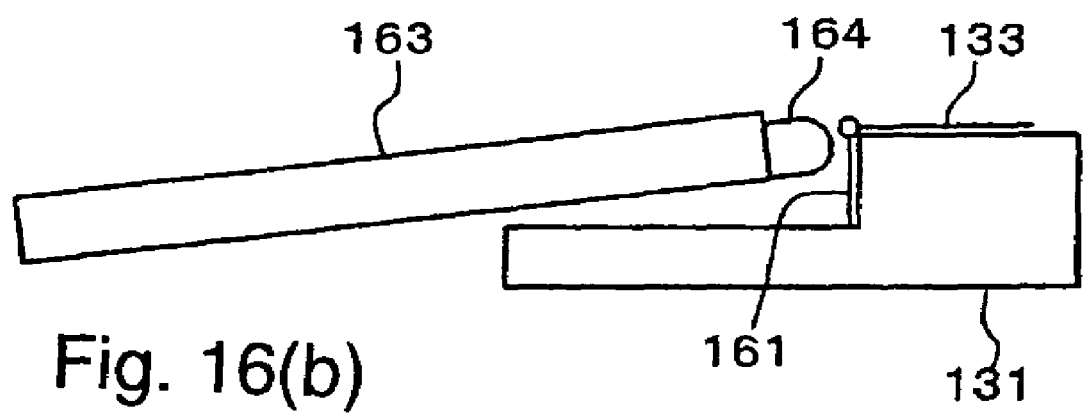

In the mode shown in FIG. 8, the rotating portion 90 is arranged to rotate so that the projection 92 moves generally in a vertical direction. Alternatively, a rotating portion 99 such as shown in FIG. 9 may be used which has a rotary shaft 96 extending vertically, a projection 97 also extending vertically, and a spring 98 for urging the projection 97 leftward. In this case, grooves 95 extending vertically are provided in the movable portion 6 instead of the grooves 82 shown in FIG. 8.

In this embodiment, as described above, the position of the guide face 3 can be changed in the direction of intersection with the guide face 3. Therefore the apparatus can be adapted to a plurality of different models of notebook PCs differing in the distance between the PC connector and the guided face.

Also, an urging mechanism for applying an urging force to the movable portion 6 so that the guide face 3 moves in the direction of the connector 2 on the apparatus side and a positioning mechanism (rod 49, positioning mechanism 87, etc.) for stopping the movable portion 6 at one of two or three or more predetermined positions in the moving range of the movable portion 6 against the urging force are provided, thereby enabling the movable portion 6 to be easily positioned at the position corresponding to each model.

Means (ejecting members 16, etc.) for releasing the movable portion 6 from the state of being stopped by the positioning mechanism according to the coupling between the coupling face and the mated coupling face is also provide to enable the guided surface to be automatically covered even in a case where docking is performed without positioning the movable portion 6 at the position corresponding to a certain model. In this manner, the RJ-11 terminal or the like in the back face of a notebook PC can be prevented from being touched by a user under ordinary use conditions.

Flap 10 having its one end forming the whole or part of the guide face 3 and the other end connected to the main body of the movable portion 6 through a rotary shaft and capable of rotating the one end so that the one end faces in a direction opposite to the direction in which the coupling face 1 faces is also provided, thereby enabling docking to be performed so as to avoid interference with a large battery mounted in the guided face.

In the drawings and specifications there has been set forth a preferred embodiment of the invention and, although specific terms are used, the description thus given uses terminology in a generic and descriptive sense only and not for purposes of limitation.

What is claimed is:

1. An apparatus comprising:
   a coupling face that couples with a coupling face on a portable device during docking of die portable device;
   a connector provided on the coupling face of the apparatus to connect with a connector of the portable device upon coupling therewith;
   a guide member provided adjacent to the coupling face of the apparatus, the guide member being operable to guide the portable device into position during docking of the portable device and to engage a back face of the portable device upon docking of the portable device; and
   a mechanism operatively associated with the guide member for changing the position of the guide member relative to the coupling face of the apparatus in accommodation of differing portable devices.

2. The apparatus according to claim 1, wherein the portable device is a portable personal computer, the coupling face of the apparatus engages a base of the portable personal computer, and the guide member engages a back face of the portable personal computer.

3. The apparatus according to claim 1, wherein the guide member comprises a first guide face fixed to the apparatus and a second guide face storably provided between the first guide face and the connector of the apparatus.

4. The apparatus according to claim 3, wherein the second guide face is provided on a member that can be rotated about a rotation axis parallel to the coupling face of the apparatus and stored under the coupling face of the apparatus.

5. The apparatus according to claim 3, wherein the second guide face is provided on a member capable of being stored under the coupling face of the apparatus by being moved in a direction intersecting the coupling face of the apparatus.

6. The apparatus according to claim 1, wherein the guide member comprises a flap capable of being rotated so that one end of the flap faces in a direction opposite to the direction in which the coupling face of the apparatus faces, the one end of the flap constituting the whole or part of a guide face of the guide member, and another end of the flap being connected to the guide member through a rotary shaft for rotation.

7. The apparatus according to claim 1, wherein the guide member comprises a movable portion on which a guide face is provided, the movable portion being mounted so as to be movable in the direction of the connector of the apparatus, and wherein the mechanism comprises a pusher, the pusher being operable to apply an urging force to the movable portion so that the guide face moves in the direction of the connector of the apparatus, and a positioner, the positioner being operable to position the movable portion by stopping the movable portion in the direction of its movement at one of at least two predetermined positions against the urging force.

8. The apparatus according to claim 7, further comprising a release, the release being operable to release the movable portion from a state of being stopped by the positioner according to the coupling between the coupling face of the apparatus and the coupling face on the portable device to enable the guide face to be moved in the direction of the connector of the apparatus in a case where the portable device is a predetermined model.

9. The apparatus according to claim 8, wherein the release has a model detecting projection provided on the coupling face of the apparatus, the model detecting projection being depressed by the coupling face on a predetermined model of the portable device at the time of docking, and the model detecting projection not being depressed by the coupling face on a different model of the portable device at the time of docking because a recess is provided in the corresponding portion of the coupling face on the different model of the portable device.

10. The apparatus according to claim 7, wherein the pusher comprises a translating member mounted on a stationary portion of the apparatus so as to be movable in directions substantially parallel to the guide face of the movable portion and the coupling face of the apparatus, a tensile coil spring provided between the translating member and the stationary portion, and a pair of rotating members each rotatably connected to the translating member and the movable portion so as to form a parallel link including the translating member and the movable portion as nodes.

11. The apparatus according to claim 7, wherein the pusher comprises a pair of lever members intersecting each other in an X-shaped form and rotatably connected to each other, and a tensile coil spring provided between one end of the pair of lever members, the pair of lever members being rotatably mounted at their point of intersection to a stationary portion of the apparatus, another end of the pair of lever members being mounted to the movable portion so as to be rotatable and movable along the lengthwise directions of the pair of lever members.

12. The apparatus according to claim 10, wherein the movable portion comprises a flap capable of being rotated so that one end of the flap faces in a direction opposite to the direction in which the coupling face of the apparatus faces, the one end of the flap constituting the whole or part of the guide face of the movable portion, another end of the flap being connected to the movable portion through a rotary shaft for rotation, and wherein each rotating member comprises a projection outside the position at which it is mounted to the movable portion, the projection being positioned at such an angle as to be parallel to a rotation axis of the flap and in such a position as not to obstruct the rotation of the flap when the guide face is in a predetermined position remote from the connector of the apparatus, and being positioned so as to have a predetermined angle from the rotation axis of the flap, to support the flap and to check the rotation of the flap when the guide face is in a predetermined position closer to the connector of the apparatus.

13. A portable device capable of being docked with the apparatus according to claim 9, wherein the device comprises the recess according to claim 9.

14. A docking type function providing apparatus for providing a predetermined function to a portable device docked with the apparatus via their respective connectors, comprising:

a stationary portion in which an electronic circuit for providing the predetermined function is provided;

a coupling face which is fixed on said stationary portion and to which a bottom face of the portable device is coupled;

a hook-like member provided on said coupling face and engaged with a mated engaging portion of the portable device to effect said coupling;

said connector of the apparatus provided on said coupling face to connect with said connector of the device by said coupling;

a push plate provided on said coupling face to push and open a cover for protection of said connector of the apparatus at the time of said connection;

a connector guide provided on said coupling face to guide said connector of the device so that said connector of the device is aligned with said connector of the apparatus;

a positioning projection provided on said coupling face to position a bottom face of the portable device on said coupling face;

a movable portion having a guide face for guiding a back face of the portable device at the time of docking, capable of moving on said stationary portion in a direction perpendicular to said guide face, urged toward said connector of the device by an urging force, and capable of being positioned at any of a plurality of positions against said urging force;

a guide plate provided on said guide face to guide the portable device at the back side in directions parallel to said guide face and said coupling face;

an eject button for release from the engagement by said hook like member;

an ejecting member for disconnecting said connectors in such a manner that said ejecting member is caused to project above said coupling face according to depression of said eject button to push upward the bottom face of the portable device upward;

a model detecting projection provided on said coupling face, said projection being depressed by the mated coupling face of a predetermined model of the portable device at the time of docking, said projection being not depressed at the time of docking of a different model of the portable device because a recess is provided in the corresponding portion of the mated coupling face; and a flap provided on said movable portion so as to constitute said guide face and to be rotatable so that its end portion on the guide face side is moved downward when said movable portion is in a rear position.

* * * * *